H. J. BECK.
VALVE REMOVER.
APPLICATION FILED APR. 21, 1911.
1,038,520.
Patented Sept. 17, 1912.
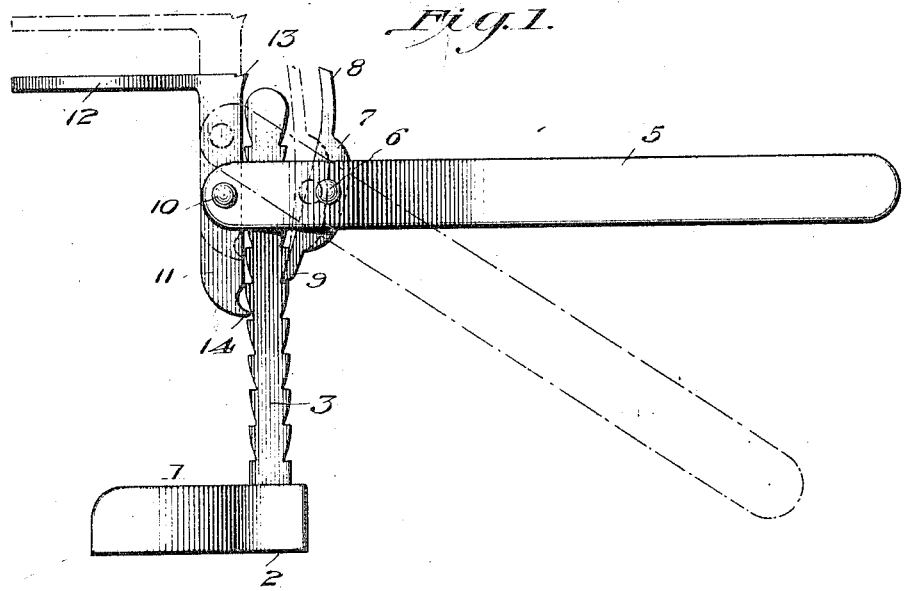
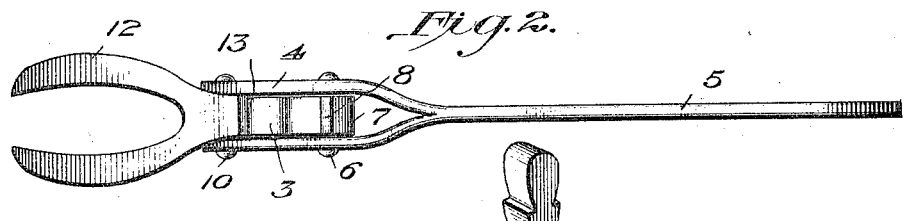
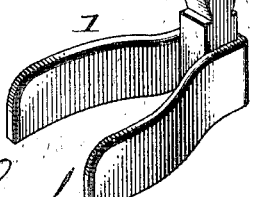
Witnesses:
Inventor:
Harry J. Beck

UNITED STATES PATENT OFFICE.

HARRY J. BECK, OF INDIANA, PENNSYLVANIA.

VALVE-REMOVER.

1,038,520.   Specification of Letters Patent.   Patented Sept. 17, 1912.

Application filed April 21, 1911. Serial No. 622,640.

*To all whom it may concern:*

Be it known that I, HARRY J. BECK, a citizen of the United States, residing at Indiana, county of Indiana, and State of Pennsylvania, have invented certain new and useful Improvements in Valve-Removers, of which the following is a specification.

This invention relates to valve removers.

The present invention has for its object the provision of a simple, inexpensive and reliable tool or implement adapted to be used for compressing the springs of valves to permit the latter to be removed, being particularly adapted for use in removing the valves of internal combustion engines.

My object is to provide a device of the character set forth having a novel bifurcated base and a new spring compressing and supporting member, whereby the device may be placed on any flat surface, fitted into either a large or a small space when in use and thus be adapted for application to valves however placed. The base and the spring supporting and compressing device are combined with novel pawl and rack mechanism and a handle, whereby said base and supporting device may be reversed, thus permitting the use of the implement in all situations where a valve has to be taken out.

The invention is set forth fully hereinafter and the novel features are recited in the appended claims.

In the accompanying drawings:—Figure 1 is a side elevation, dotted lines representing the operation; Fig. 2, a plan view; and Fig. 3, a detail perspective of the base and the upright rack.

The base 1 i forked or bifurcated an has a flat lower surface 2 and it is thus made adaptable to straddle or fit around the post of the valve. Secured to and rising from the base is the double rack 3, and by virtue of the bifurcated base, this rack can be disposed as close to the valve as desired.

Straddling the rack 3 is the bifurcated end 4 of a lever 5. Pivoted to the lever at 6 and disposed in the bifurcated part thereof is a double pawl 7 having the opposite points or teeth 8 and 9, either one of which is adapted to engage the rack 3.

Pivoted at 10 and disposed between the bifurcated part 4 of the lever, is the shank 11 of a bifurcated or forked spring-compressing and supporting or valve-lifting member 12. The shank 11 has teeth 13 and 14 at its upper and lower ends, either of which may be engaged with the double rack 3 on the opposite side thereof from the pawl 7.

In using the device, the base 1 is disposed in such position as may be necessary to enable the forked supporter 12 to straddle the valve stem and engage with the spring of the valve. The lever 5 is then worked up and down, which causes the teeth 9 and 14 to alternately move and engage successive teeth of the rack 3, thereby elevating the supporting device 12 and compressing the spring of the valve, enabling the cotter or pin of the valve stem to be removed and the valve to be taken out. The bifurcated base 1 permits the rack 3 to be disposed as close to the valve stem as desired, as said base may be made to straddle the valve post.

The lever 5 and parts carried thereby may be entirely removed from the rack 3 and reversed or turned up side down and again reëngaged with said rack, in which case the points or teeth 8 and 13 will be lowermost and adapted to engage the teeth of the rack 3, and the points 9 and 14 will be uppermost. This disposition of the parts enables the forked supporting device 12 to be brought down as low in relation to the base 1 as may be desired and the reversibility of the parts enables the device to be used in either a large or a small space, or in any situation, according to the arrangement of the valve that is to be operated on. The use of the pawls and lever enables the supporting device 12 to be shifted with a very slight exertion on the lever 5.

Having thus described my invention, what I claim as new and desire to secure by Letters Patent, is:

1. In a valve removing tool, the combination with a base and upright, of a valve supporting member composed of a shank and a supporter arranged at one end part thereof and laterally in relation thereto, said shank being slidable on the upright and the supporting member being reversibly related to the base, and means coöperating with the shank and upright for elevating said valve supporting member in relation to the base when it is in either normal or reversed position.

2. In a valve removing tool, the combination with a base, of a double rack rising therefrom, a reversible valve supporting device having one tooth for engaging the rack in one position by the valve supporting device, and another tooth for engaging the rack in a reverse position of the valve supporting device, an operating lever pivoted to said valve supporting device, and a double pawl carried by the lever, which pawl is adapted to engage the double rack, whereby when the valve supporting device is reversed the pawl may engage with the rack.

In testimony whereof, I hereunto affix my signature in presence of two witnesses.

HARRY J. BECK.

Witnesses:
L. E. MULLER,
JOHN McADOO.